United States Patent [19]
Findlay et al.

[11] 3,929,960
[45] Dec. 30, 1975

[54] METHOD FOR PRODUCING ORIENTED PLASTIC SHOTSHELLS

[75] Inventors: Donald Urquhart Findlay; Francis Hamnet Garland McCaffrey; Derek Edgar Alexander Scuffell, all of Brownsburg, Canada

[73] Assignee: Canadian Industries Limited, Montreal, Canada

[22] Filed: Oct. 1, 1973

[21] Appl. No.: 402,594

[52] U.S. Cl. .............. 264/292; 102/43 P; 264/296; 264/322; 264/DIG. 66
[51] Int. Cl.² ........................................ B29C 17/02
[58] Field of Search ............ 264/292, 320, DIG. 66, 264/294, 322, 296, 323; 102/43 P

[56] References Cited
UNITED STATES PATENTS

| | | | |
|---|---|---|---|
| 3,205,290 | 9/1965 | Covington et al. | 264/292 |
| 3,284,560 | 11/1966 | King et al. | 264/292 |
| 3,492,387 | 1/1970 | Larson | 264/292 X |
| 3,514,468 | 5/1970 | Sutcliffe et al. | 264/292 X |

OTHER PUBLICATIONS

Encyclopedia of Polymer Science and Technology, Vol. 6, Sections "Extrusion," New York, Interscience, 1967, pp. 466–467.

Whittington, Lloyd R. "Whittington's Dictionary of Plastics," Stamford, Conn., Technomic, 1968, pp. 101, 169 and 230.

*Primary Examiner*—Philip Anderson
*Attorney, Agent, or Firm*—Donald G. Ballantyne

[57] ABSTRACT

An integral, oriented polyolefinic shotshell is provided by a method whereby a tubular blank of material is advanced into a die cavity and subsequently forced over a mandrel and partway through an annular space to form the tubular portion of the shell. The unformed portion of the blank is compressed to form the head of the shell and the completed shell is then removed from the die and stripped from the mandrel.

3 Claims, 5 Drawing Figures

METHOD FOR PRODUCING ORIENTED PLASTIC SHOTSHELLS

This invention relates to a new method for producing one-piece oriented shotshells from highly crystalline polyolefines. In particular, the method of the invention provides for the production of high tensile strength polyolefinic shotshells wherein the tube of the shotshell and the head end and base wad are an integral unit.

It has long been the desideratum of the ammunition industry to provide an economic, safe and efficient method for the production of highly oriented one-piece crystalline plastic shotshells and a number of proposals have been put forward to achieve these ends. For example, Covington et al. in U.S. Pat. No. 3,198,866 proposed a method of producing plastic tubular members of high tensile strength which could then, by subsequent additional operations be converted into metal-headed plastic shotshells. King et al. in Canadian Pat. No. 860,034 proposed a method of making a plastic shotshell case by the working of a cup-shaped blank by means of a draw punch and draw die. Metcalf et al. in Canadian Pat. No. 865,968 similarly employ a die and plunger method to deform a cup-shaped blank of plastic material within a cavity. Koschade in Canadian Pat. No. 839,148 utilizes a process wherein a molten thermoplastic is injected into a mold to form a slug which is thereafter cooled and compressed into the desired shotshell shape. The prior art methods are not completely free of drawbacks which tend to limit their commercial utilization. They may, for example, require slow, multistage and hence uneconomic operations; they may entail difficulty of control of the process conditions or they may yield a product of variable quality.

It is the object of this invention to provide a method for rapidly and economically manufacturing a high quality integral, one-piece, plastic shotshell.

To achieve this object, the present invention provides a method of producing an integral, oriented, crystalline polyolefinic shotgun cartridge comprising the steps of:

a. heating an elongated, open-ended, thick-walled tubular blank of crystalline polyolefinic material to a temperature between about 80°F. and 240°F., but below the crystalline melting point of said polyolefinic material;

b. advancing said heated blank into a substantially cylindrical die cavity by means of a reciprocating mandrel;

c. forcing said heated blank longitudinally on the action of a reciprocating ram for a distance equal to part of its length through an annular space defined by one outlet of said die cavity and said mandrel in such a way that said blank is expanded circumferentially over said mandrel and reduced in wall thickness by extrusion through said annular space to form a biaxially oriented tubelike structure and simultaneously compressing the portion of said tubular blank which has not been advanced through said annular space into the shape of a formed, shotshell head and base wad integral with the said oriented tubelike structure;

d. retracting the said ram, and further advancing said mandrel and formed tubelike structure and integral shotshell head through the said die cavity; and e. reversing the direction of movement of said mandrel to remove therefrom said formed tubelike structure and integral shotshell head.

The invention will be more easily understood by reference to the accompanying description drawings in which corresponding numerals refer to the same parts and in which.

Figure 1:
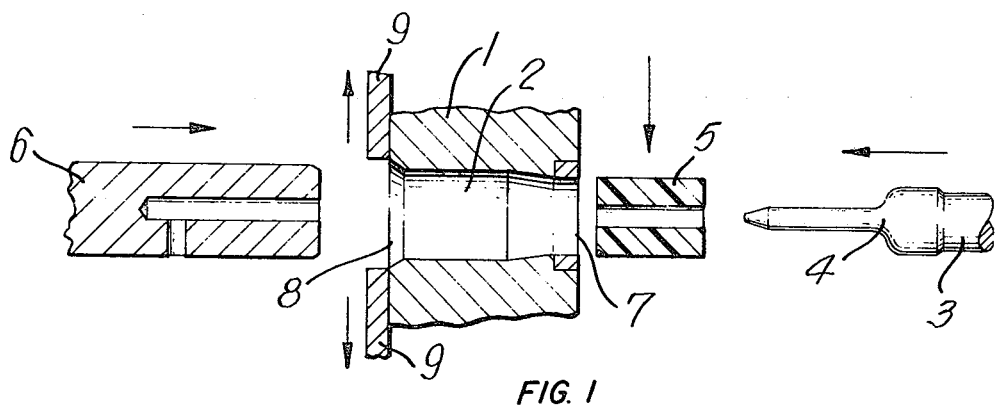
FIG. 1 is a diagrammatic, elevational view partly in cross-section showing the principal parts of the apparatus of the invention ready to process a blank of polyolefinic material.

With reference to the drawings and according to the preferred embodiment of the process of the invention there is shown in FIG. 1 a heated die assembly 1 having a substantially cylindrical or slightly tapered cavity 2 therethrough. Reciprocal mandrel 3 with a tapered shoulder 4 is shown in a position to advance towards opening 7 in cavity 2 in the direction of the arrow. Tapered shoulder 4 conforms to the desired internal basewad configuration within a finished shotshell. A thickwalled tubular blank 5 is shown interposed between mandrel 3 and die cavity 2. A retractable ram 6 is shown adapted to move in the direction of the arrow towards opening 8 in die cavity 2. Reciprocal mandrel 3 and ram 6 are moved in and away from die cavity 2 by pneumatic or hydraulic pistons (not shown). Surrounding opening 8 of cavity 3 is stripper piece 9. The apparatus as depicted in FIG. 1 represents the relationship of the parts at the beginning of the operating cycle.

Figure 2:
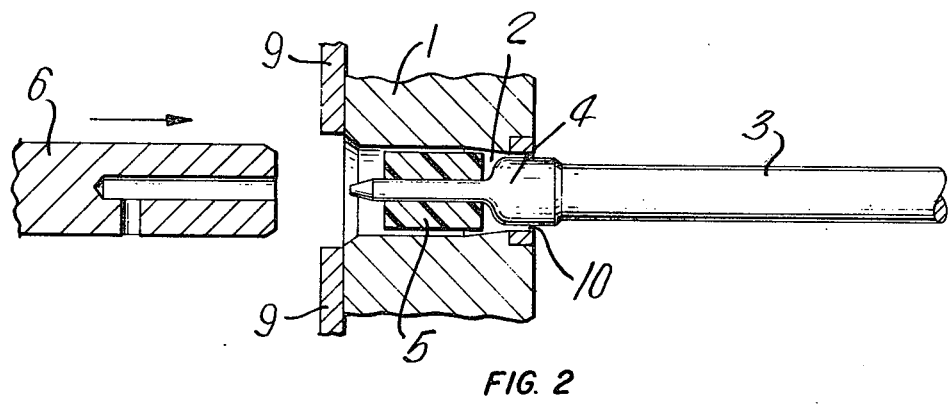
FIG. 2 shows the apparatus of FIG. 1 with the blank of material located within a die assembly.

Referring to FIG. 2, which depicts the first stage in the operating cycle, mandrel 3 is shown as having moved forward into cavity 2 through opening 7 and carrying a blank 5 before it. The tapered shoulder 4 of mandrel 3 provides an annular space 10 between the mandrel and the walls of opening 7 of die 1.

Figure 3:
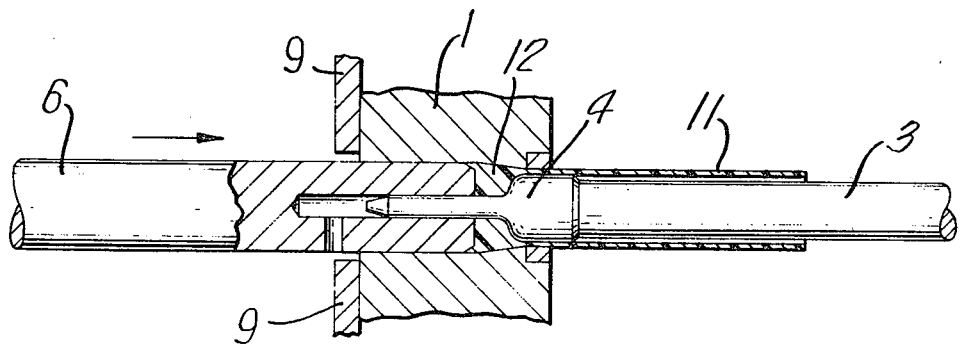
FIG. 3 shows the apparatus of FIG. 1 with the blank of material substantially fully shaped.

Referring to FIG. 3 which depicts the second stage in the operating cycle, ram 6 is advanced into opening 8 of cavity 2 and against blank 5 to cause the material of blank 5 to be partly extruded through annular space 10 in the form of tubular shotshell body 11. Preferably die 1 at opening 2 is notched to produce a corrugated effect on much of the outer surface of body 11. Simultaneously the head-end 12 of shotshell body 11 is formed by the force exerted by ram 6 upon the unextruded portion of blank 5 within cavity 2 of die 1 and against the tapered shoulder 4 of mandrel 3.

Figure 4:
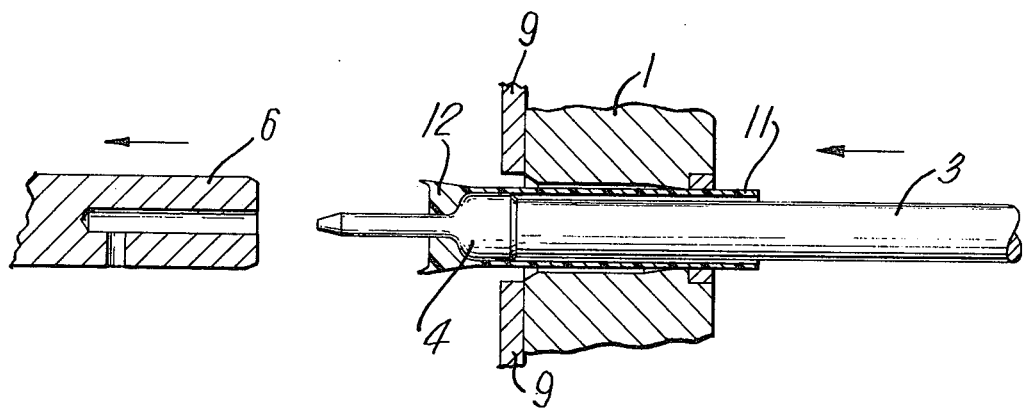
FIG. 4 shows the apparatus of FIG. 1 with the fully shaped tubelike shotshell structure being removed from the die assembly.

Referring to FIG. 4, which depicts the third stage in the operating cycle, ram 6 is retracted away from die 1 and mandrel 3 is advanced through cavity 2 carrying completed shotshell body 11 with it.

Figure 5:
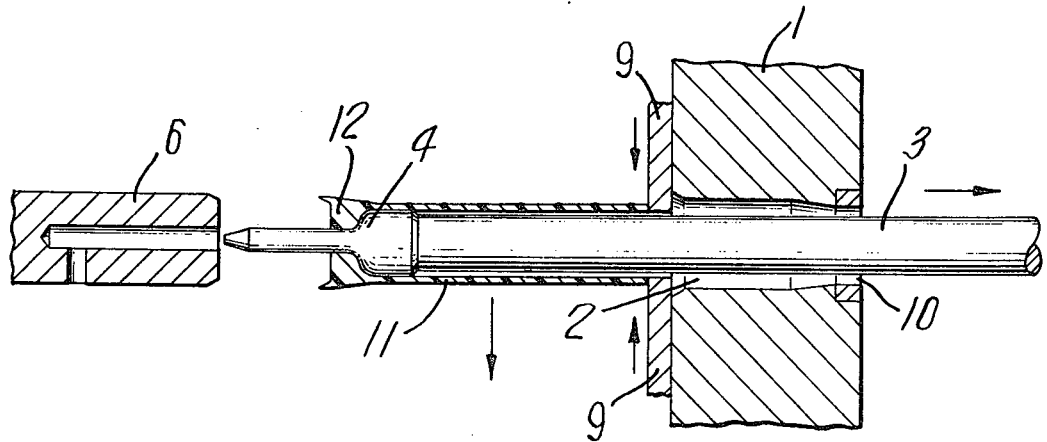
FIG. 5 shows the shaped shotshell ready for removal from the apparatus.

FIG. 5 shows the final stage of the cycle when the direction of mandrel 3 is reversed and retracted through stripper piece 9 which has been closed about mandrel 3 and the completed formed shotshell body 11 with integral head-end 12 is removed or stripped from mandrel 3. Ram 6 and mandrel 3 can then be repositioned as in FIG. 1 for the start of a successive cycle.

It may be seen that unlike prior art processes, the present invention makes use of a moveable mandrel axially positioned within a forming die, which combination allows for simultaneous shotshell tube orientation and head-end forming and also permits the simple and quick removal of the finished shotshell from the forming die.

The crystalline polyolefin suitable for use in the process of the invention for manufacture of shotshells is preferably a high density polyethylene having a density of from about 0.942 to about 0.965. However, other suitable polymeric or copolymeric polyolefinic materials as such or in blended form, such as polypropylene or mixtures of polypropylene and polyethylene may be utilized. It will be appreciated that while the process and apparatus of the invention has particular utility in the productions of one-piece oriented high strength shotshells, other similarly shaped cup-like bodies may be manufactured in a like manner. The choice, therefore, of the appropriate thermoplastic material will depend on the qualities sought in the end product.

A wide range of working temperatures may be employed in the working of the thermoplastic blank into the completed shotshell so long as the recrystallization temperature of the thermoplastic is not exceeded. The plastic blank and the orienting and forming die are preferably maintained in the range of 130°–170°F. when using a high density polyethylene. The pressures employed in the working pistons associated with the ram and mandrel will generally vary between about 5 and 15 tons and will depend on the material being worked and the temperatures employed.

The size of the tubular, thick-walled blank will be slightly smaller in diameter than the diameter of opening 7 of cavity 2. The volume of plastic material in the blank will depend on the desired dimensions of the finished shotshell and can be applied to a wide range of calibres. The blanks will of necessity be constant in size and material of composition from blank to blank and will be free of flaws, gels and voids. The blanks are preferably made by cutting off successive lengths of a continuous tubular extrudant. However, the blanks can readily be made by injection moulding techniques so that blanks with shapes slightly modified from the tubular form to compensate for uneven or unusual shrinkage patterns in the final component may be utilized. Lubrication of the blanks by, for example, preheating in a constant temperature lubricant bath aids in maintaining high production rates precluding the need for a dwell time. Generally, the requirements for optimum plastic extrusion conditions are known from the prior art.

The tubular, thick-walled blank for subsequent formation into a 12 gauge shotshell, for example, will generally be about 1.00 inch in length and have an outside diameter of about 0.69 inch and in inside diameter of about 0.27 inch. It has been found that best results are achieved when the blank has only a slightly smaller outside diameter than the finished body of the shotshell and is processed through a die of essentially parallel bore of a diameter chosen to accommodate the slug dimension. It is, however, possible to form shells from blanks which are smaller than the finished shell so long as sufficient volume of plastic is present. These operations, require appropriately enlarged die bore profiles to allow for the tendency to contraction of the base end of the blank as it is formed into the finished shell.

Similarly, the mandrel may be modified in form to provide for a substantial taper over approximately half of its parallel working surface at the pilot end, such that the wall of the finished plastic shell will demonstrate a thicker section of as much as 0.050 inch, immediately adjacent to the basewad portion and tapering backwards gradually to meet the unifom 0.030 inch wall thickness. This constitutes a preferred configuration, as it exerts a favourable influence on the external profile of plastic casing by further precluding preferantial shrinkage of the thicker base section immediately adjacent to a thinner wall section.

Shotshells produced according to the process of this invention have been found to have a longitudinal tensile strength of from about 20,000 psi to about 30,000 psi. Circumferential tensile strengths of shotshells produced range from about 5,500 psi to about 8,500 psi.

A particular advantage which accrues through the use of the method and apparatus of the invention, results from the feature that the mandrel 3 carrying the formed shotshell structure 11 passes through die cavity 2. Such a feature permits the formation of an integral shotshell having an enlarged circumferential section or a rim at its head end 12. Such a configuration would not be possible if the mandrel 3 and its attached shotshell 11 was retracted though the narrow opening 7 of die cavity 2.

What we claim is:

1. A method of producing an integral, oriented, crystalline polyolefinic shotgun cartridge having an enlarged head portion comprising the steps of:
   a. heating an elongated, open-ended, thick-walled tubular blank of crystalline polyolefinic material to a temperature between about 80°F. and 240°F., but below the crystalline melting point of said polyolefinic material;
   b. advancing said heated blank into a substantially cylindrical die cavity having an enlarged circumferential head end position by means of a reciprocating mandrel;
   c. forcing said blank longitudinally for a distance equal to part of its length through an annular space defined by one outlet of said die cavity and said mandrel on the action of a reciprocating ram in such a way that said blank is expanded circumferentially over said mandrel and reduced in wall thickness by extrusion through said annular space to form a biaxially oriented tubelike structure and simultaneously compressing the portion of said tubular blank which has not been advanced through said annular space into the shape of a formed, shotshell head and base wad integral with the said oriented tubelike structure and having an enlarged head portion;
   d. retracting the said ram and further advancing the said mandrel and formed tubelike structure and integral shotshell head through the said die cavity; and
   e. reversing the direction of movement of said mandrel to remove therefrom said formed tubelike structure and integral shotshell head having said enlarged head portion.

2. A method according to claim 1 wherein the said tubular blank is heated to a temperature between about 130°F. and 170°F.

3. A method according to claim 1 wherein the crystalline polyolefin is high density polyethylene.

* * * * *